(12) United States Patent
Butcher et al.

(10) Patent No.: US 10,565,668 B2
(45) Date of Patent: Feb. 18, 2020

(54) USER INTERFACE FOR AUTOMATING SALES TRAINING ACTIVITIES

(71) Applicant: Dell Products L.P., Round Rock, TX (US)

(72) Inventors: Karen Butcher, Dublin (IE); Sandra Murtagh, Tarporley (GB)

(73) Assignee: Dell Products L.P., Round Rock, TX (US)

( * ) Notice: Subject to any disclaimer, the term of this patent is extended or adjusted under 35 U.S.C. 154(b) by 645 days.

(21) Appl. No.: 14/992,145

(22) Filed: Jan. 11, 2016

(65) Prior Publication Data
US 2017/0200245 A1 Jul. 13, 2017

(51) Int. Cl.
| | |
|---|---|
| G06Q 50/00 | (2012.01) |
| G06Q 50/20 | (2012.01) |
| G06Q 10/06 | (2012.01) |
| G06Q 10/10 | (2012.01) |
| G09B 7/02 | (2006.01) |
| G06Q 50/22 | (2018.01) |
| G06T 11/00 | (2006.01) |
| G09B 19/04 | (2006.01) |

(52) U.S. Cl.
CPC ... *G06Q 50/2057* (2013.01); *G06Q 10/06393* (2013.01); *G06Q 10/06398* (2013.01); *G06Q 10/063114* (2013.01); *G06Q 10/105* (2013.01); *G06Q 50/22* (2013.01); *G06T 11/00* (2013.01); *G09B 7/02* (2013.01); *G09B 19/04* (2013.01)

(58) Field of Classification Search
None
See application file for complete search history.

(56) References Cited

U.S. PATENT DOCUMENTS

| | | | |
|---|---|---|---|
| 7,499,870 B1 * | 3/2009 | Petrossi | G06Q 10/00 705/7.32 |
| 8,200,527 B1 * | 6/2012 | Thompson | G06Q 10/0639 705/7.38 |

(Continued)

OTHER PUBLICATIONS

The ATD Competency Model, https://www.td.org/Certification/Competency-Model, printed Jan. 11, 2016.

(Continued)

*Primary Examiner* — Gurkanwaljit Singh
(74) *Attorney, Agent, or Firm* — Terrile, Cannatti & Chambers; Stephen A. Terrile

(57) ABSTRACT

A system, method, and computer-readable medium are disclosed for performing an automated sales training activity operation, comprising: performing an assessment operation on an individual sales maker, the assessment operation ensuring the individual sales maker takes only the training needed by the individual sales maker; generating a unique personalized training plan for the individual sales maker; delivering training to the individual sales maker based upon the unique personalized training plan; certifying the individual sales maker based upon completion of the training, the certifying indicating a knowledge and proficiency level of the individual sales maker, the certifying also indicating progress of the individual sales maker towards completion of the unique personalized training plan and, presenting information regarding the certifying via a sales training activity user interface.

18 Claims, 8 Drawing Sheets

(56) References Cited

U.S. PATENT DOCUMENTS

| | | | | |
|---|---|---|---|---|
| 2008/0120169 A1* | 5/2008 | Ward | ............... | G06Q 10/06398 |
| | | | | 705/7.42 |
| 2009/0132284 A1* | 5/2009 | Fey | ................... | G06F 19/3418 |
| | | | | 705/3 |
| 2009/0164306 A1* | 6/2009 | Petrossi | ................ | G06Q 10/00 |
| | | | | 705/7.33 |
| 2009/0319338 A1* | 12/2009 | Parks | ................ | G06Q 10/0639 |
| | | | | 705/7.38 |
| 2009/0319344 A1* | 12/2009 | Tepper | ............. | G06Q 10/06393 |
| | | | | 705/7.39 |
| 2010/0028846 A1* | 2/2010 | Cohen | ..................... | G09B 5/06 |
| | | | | 434/323 |
| 2014/0329210 A1* | 11/2014 | Masood | ............... | G06Q 10/103 |
| | | | | 434/219 |
| 2015/0004571 A1* | 1/2015 | Ironside | .................. | G09B 5/10 |
| | | | | 434/185 |

OTHER PUBLICATIONS

IBM, Kenexa Talent Frameworks, http://www-03.ibm.com/software/products/en/ibm-kenexa-talent-frameworks, printed Jan. 11, 2016.
Accenture, Strategy, Consulting, Digital, Technology and Operations, http://www.accenture.com, printed Jan. 11, 2016.
Microsoft, Partner Network, https://mspartnerlp.mspartner.microsoft.com/LearningPath/PathHome, printed Jan. 11, 2016.

* cited by examiner

USER INTERFACE FOR AUTOMATING SALES TRAINING ACTIVITIES

BACKGROUND OF THE INVENTION

Field of the Invention

The present invention relates to information handling systems. More specifically, embodiments of the invention relate to a user interface for automating sales training activities.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often with businesses, such as businesses which relate to information handling system industry, employee education can be challenging. For example, sales training activities are often presented in a common format for all employees receiving the training (i.e., a 'one size fits all' approach). For example, training activities might include mandatory quarterly business training for new products, solutions and tools; selling skills training to drive behavioral change and ad-hoc training programs to address specific needs for a particular country and/or region. With many businesses, the training activities are the responsibility of a learning and development organization within the business. While business needs and an ever-changing environment required that a sales training curriculum be delivered to sales makers; it could be challenging to measure an impact of the training and whether the training was making a difference to sales makers such as by determining how the sales training activities effected performance of the sales makers.

SUMMARY OF THE INVENTION

A system, method, and computer-readable medium are disclosed for performing an automated sales training activity operation. The automated sales training activity operation is performed via an end to end sales training activity framework. In various embodiments, the sales training activity operation aligns learning with competencies expected within a sales role of a company. The sales training activity operation is fully integrated with human resource (HR) performance management resulting in certification and the opportunity for career progression for individual sales makers. In various embodiments, the framework comprises one or more of a plurality of components. The automated sales training activity operation accesses one of a plurality of role packets when performing an individual sales maker assessment. The each of the plurality of role packets corresponding to a particular sales role. Each of the plurality of role packets defines expectations for a particular role and include information regarding role definition, role responsibilities, competencies required for the role and Key Performance Indicators (KPIs). The role packets can include KPI role packets, rules of engagement type role packets and global competencies type role packets.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
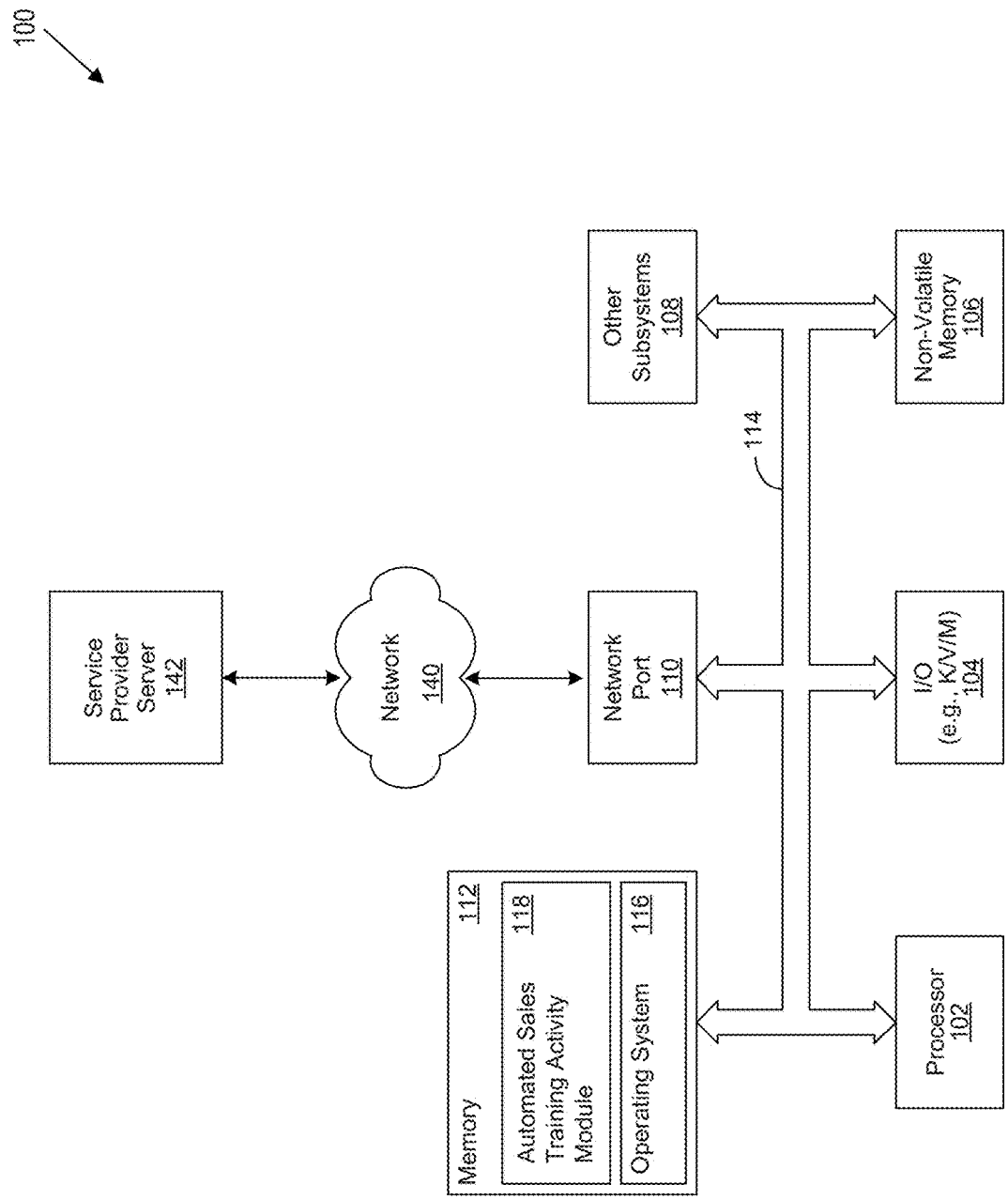
FIG. 1 shows a general illustration of components of an information handling system as implemented in the system and method of the present invention.

A system, method, and computer-readable medium are disclosed for performing a sales training activity automation operation. In various embodiments, the sales training activity automation operation is performed via an integrated end to end framework which enables individuals to receive personalized training (i.e., training needed by a specific individual) thereby delivering the right training in the right way at the right time. The framework is also aligned with business performance and career progress of every sales professional within a sales organization. The sales training automation operation addresses one or more of a plurality of objectives. For example, the sales training automation operation simplifies learning for sales makers and provides individualized relevant training, accurate and timely progress tracking, user friendly tools, user friendly guidelines, and a personalized training sequence. Such a sales training automation operation reduces training times and facilitates recognition for excellence in a role. Additionally, the sales training operation provides managers with tools, knowledge and insights to facilitate successfully leading and achieving team goals. For example, the sales training automation operation enables leaders to better guide and coach the personnel for whom they are responsible, provides roles-based learning paths to ensure relevance to individuals on the their team, provides accurate progress tracking, provides objective success measurements. Such a sales training operation leads to a skilled and proficient sales force and is oriented toward exceptional customer experiences. Additionally, the sales training operation provides executives of the company with accurate and objective insights that inform decision making activities. For example the sales training automation operation identifies skill gaps and how the gaps can affect the business, increases net promoter score (NPS) of an organization, sales margin and revenue, increases the ability of the company to attract and retain top talent by providing robust training, increases sales makers effectiveness via high quality, consistently delivered training and provides clear measures and reports for identifying strengths and opportunities within a sales organization.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a sales training activity automation module 118.

The sales training activity automation module 118 performs a sales training activity automation operation. In various embodiments, the sales training activity automation module 118 comprises an integrated end to end framework which enables individuals to receive personalized training (i.e., training needed by a specific individual) thereby delivering the right training in the right way at the right time. The framework is also aligned with business performance and career progress of every sales professional within a sales organization. The sales training automation operation addresses one or more of a plurality of objectives. For example, the sales training automation operation simplifies learning for sales makers and provides individualized relevant training, accurate and timely progress tracking, user friendly tools, user friendly guidelines, and a personalized training sequence. Such a sales training automation operation reduces training times and facilitates recognition for excellence in a role. Additionally, the sales training operation provides managers with tools, knowledge and insights to facilitate successfully leading and achieving team goals. For example, the sales training automation operation enables leaders to better guide and coach the personnel for whom they are responsible, provides role-based learning paths to ensure relevance to individuals on the their team, provides accurate progress tracking, provides objective success measurements. Such a sales training operation leads to a skilled and proficient sales force and is oriented toward exceptional customer experiences. Additionally, the sales training operation provides executives of the company with accurate and objective insights that inform decision making activities. For example the sales training automation operation identifies skill gaps and how the gaps can affect the business, increases net promoter score (NPS) of an organization, sales margin and revenue, increases the ability of the company to attract and retain top talent by providing robust training, increases sales makers effectiveness via high quality, consistently delivered training and provides clear measures and reports for identifying strengths and opportunities within a sales organization.

Figure 2:
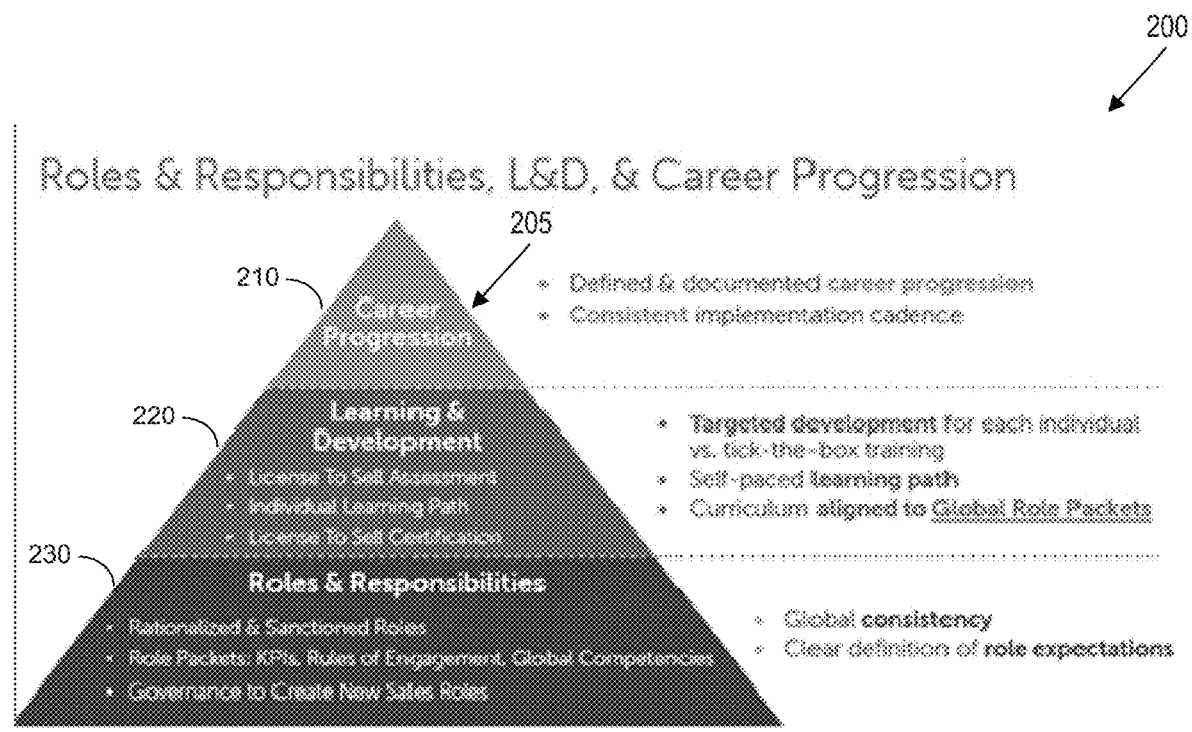
FIG. 2 shows a block diagram of showing a sales training activity responsibility delineation.

FIG. 2 is a block diagram of showing a sales training activity responsibility delineation 200. More specifically, sales training activity responsibility delineation 200 comprises a sales training activity automation system 205 which further includes a career progression portion 210, a learning and development portion 220 and a roles and responsibilities portion 230. In various embodiments, the sales training activity automation system 205 performs one or more of the functions of the sales training activity automation module 118.

The career progression portion 210 provides defined and documented career progression information and a consistent implementation cadence (i.e., the gates that a particular person performing a role are consistent across the organization where one of the gates comprises achieving a license to sell). The learning and development portion 220 provides targeted development for each individual within an organization, provides a self-paced learning path and automatically generates a curriculum for each individual which is aligned with global role packets. The role packets are applicable globally (i.e., it does not matter where the person performing the roles is based in the world, the job description (i.e., what is expected of the person performing the role and how they will be measured) for the role applies to any person performing the role. When the sales training activity automation system 205 executes the learning and development portion 220, the sales training activity automation system 205 performs an individualized assessment, generates an individual learning path and ultimately generates one or more certifications for the individual as various activities are completed. The roles and responsibilities portion 230 provides global consistency across the company as well as clear definition of role expectations. When the sales training activity automation system 205 executes the roles and responsibilities portion 230, the sales training activity automation system 205 provides rationalized and sanctioned roles, includes one or more role packets and participates in providing governance to create new sales roles. Each role packet defines expectations for a role and includes information regarding role definition, role responsibilities, competencies required for a role (i.e., what an individual performing the role needs to know and at what level of detail and Key Performance Indicators (i.e., how a person performing the role will be measured). The role packets can includes Key Performance Indicator (KPI) role packets, rules of engagement type role packets and global competencies type role packets.

Figure 3:
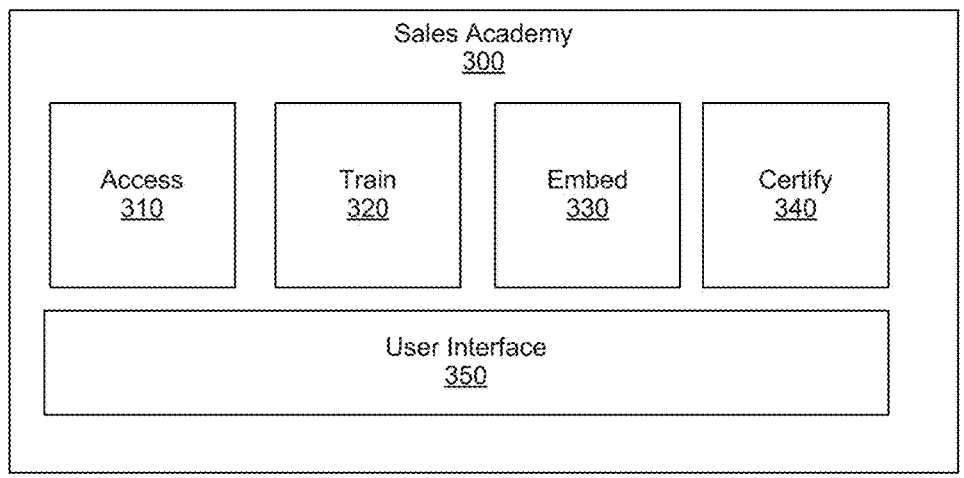
FIG. 3 shows a block diagram of a sales academy component of the sales training activity automation system.

FIG. 3 is a block diagram of a sales academy component 300 of the sales training activity automation system 205. In certain embodiments, the sales academy component 300 is executed by a learning and development organization of a company. The sales academy component 300 enables the sales training activity automation system 205 to develop a world-class sales force that delivers exceptional customer experience and strives for superior business results around the globe. For sellers, the sales academy component 300 provides individualized paths with relevant, world class curriculum to enable sales excellence and career growth. Through easy to use tools and developmental guidance, the sales academy component 300 empowers sales makers to take ownership of their own development; accelerate it and progress their career within the organization. Managers receive the tools, knowledge and insights to successfully lead and achieve team goals and achieve business results. The sales academy component creates individualized paths to sales excellence and career growth to develop managers and their teams. The sales academy component 300 recognizes that individual development is a continuous journey, starting from day of entry with the company to achieving excellence in their role. To embed a more effective learning model, sales academy 300 includes a recognition within the company of the importance of incorporating a clear path for development in role and a path for career progression for all sales makers. The sales academy component 300 includes an assess portion 310, a train portion 320, an embed portion 330 a certify portion 340 and a user interface portion 350.

When the sales training activity automation system 205 executes the access portion 310, the sales training activity automation system 205 performs an assessment operation during which the sales training activity automation system 205 ensures each individual sales makers takes only the training they individually need to take. Each individual sales makers receives a unique personalized training plan. When the sales training activity automation system 205 executes the train portion 320, the sales training activity automation system 205 performs a training operation during which the sales training activity automation system 205 delivers training for an individual sales makers based upon the unique personalized training plan. Such a training operation simplifies learning as the training is delivered via one or more discrete training modalities. When the sales training activity automation system 205 executes the embed portion 330, the sales training activity automation system 205 performs an embedding operation during which the sales activity automation system 205 embeds the learning. For the purposes of this disclosure, embedding the learning means that managers reinforce what sales makers have learned when performing sales training activities. This is achieved by managers in some instances attending training with their team and/or providing targeted manager training which provides managers tangible tools to coach and communicate with sales makers to ensure behavior change. Such an embedding operation trains managers to effectively coach and develop their team members to embed best practices. When the sales training activity automation system 205 executes the certify portion 340, the sales training activity automation system 205 performs a certify operation during which the sales activity automation system 205 provides an individual sales makers with one or more certifications (i.e., a license to sell). Such a certification indicates a knowledge and proficiency level so that the individual sales makers knows where they are on their individual development path and how much progress they have made towards completion of the individual development plan. The information provided to and generated from one or more of the assess portion 310, train portion 320, embed portion 330, and certify portion 340 are presented to via the user interface portion 350 as a sales training activity user interface.

Figure 4:
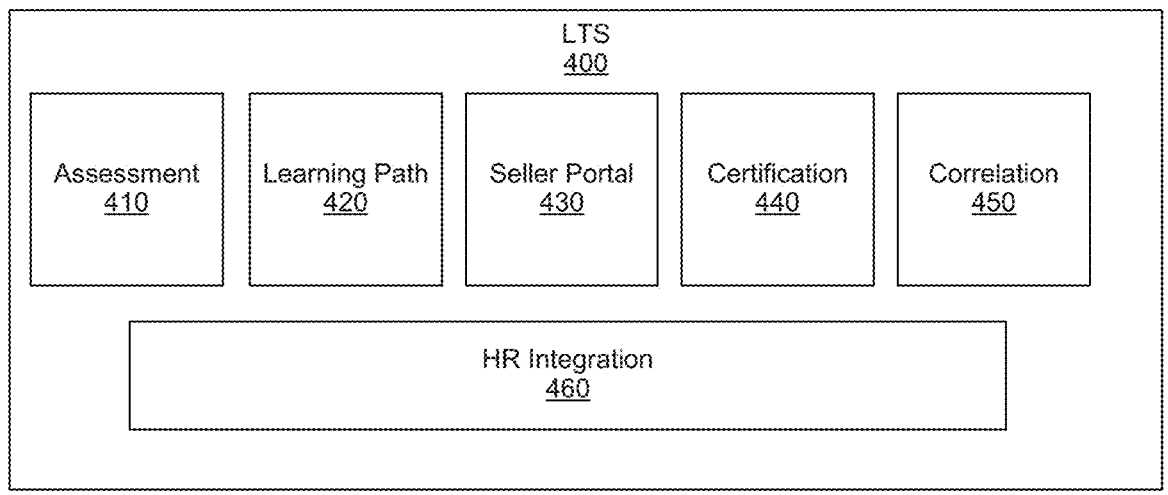
FIG. 4 shows a block diagram of a license to sell component of the sales training activity automation system.

Referring to FIG. 4, a block diagram of a license to sell component 400 of the sales training activity automation system 205 is shown. The license to sell (LTS) component 400 provides an internal global sales certification program which in certain embodiments is administered via the sales academy component 300. The LTS component 400 ensures that all sales makers receive the proper training (e.g., via targeted individualized plans) in the right way (e.g., through multiple modalities) at the right time (e.g., when they need it). In certain embodiments, the LTS component 400 is executed semiannually.

The LTS component 400 includes an automated assessment engine 410, a learning path engine 420, a seller portal engine 430, a certification engine 440, a correlation engine 450 and a human resource integration engine 460. The automated assessment engine 410 performs an automatic assessment operation for each individual sales maker. In various embodiments, the automated assessment engine includes at least one testing instruments. In various embodiments the testing instruments include at least one of a testing instrument to assess selling behaviors and a testing instrument to assess product, solutions and tools knowledge. Each testing instrument includes one or more assessment or test. Output from automated assessment engine 410 identifies individual behavior and knowledge gaps which are provided to the learning path engine 420 to provide an individual learning path. The seller portal engine 430 provides a portal for sellers, managers and executives to drive, track and measure progress. The certification engine 440 provides certification of sales makers who have achieved selling excellence. The correlation engine 450 provides results and/or business performance correlations and business insights to leadership which can be used when developing an overall strategy for a company. The human resource integration engine 460 integrates learning outcomes with human resource systems to feed into performance management and career progression activities.

More specifically, the automated assessment engine 410 enables individual sales makers to participate in a selling skills behaviors assessment. In certain embodiments, this selling skills behaviors assessment is offered at least annually. In certain embodiments, the selling skills behaviors assessment comprises an individual sales makers completing an online selling skills self-evaluation and a sales manager completing an online assessment evaluating selling behaviors of each of their team members based on observation and day to day interaction. In certain embodiments, an individual's selling skills assessment scores are an average of the self-evaluation and the sales manager evaluation. Additionally, the automated assessment engine 410 enables individual sales makers to participate in a solutions and product knowledge assessment. In certain embodiments, this solutions and product knowledge assessment is offered semiannually. In certain embodiments, the solutions and product knowledge assessment is administered during a first quarter and an interim assessment is administered during a third quarter. In certain embodiments, the interim assessment targets any categories in which an individual sales makers scored below predefined proficiency targets.

In certain embodiments, the certification engine 440 generates an LTC certification for an individual sales makers they achieve a predetermined score on each assessment. In certain embodiments, the predefined score includes one or more of achieving 65% minimum on each of the assessments and achieving greater than a 75% average across both the selling skills and solutions and product assessments. In certain embodiments, the results of the certifications of a plurality of sales makers are provided to the correlation engine 450. The correlation engine 450 performs an analysis operation on the results via a correlation application. In certain embodiments, the categories are based on scores achieved when performing the assessments. In certain embodiments, the analysis operation categorizes the sales makers into five categories. In certain embodiments, the categorization is represented on a correlation presentation where each category is presented in a distinct region of the correlation presentation.

Figure 5:
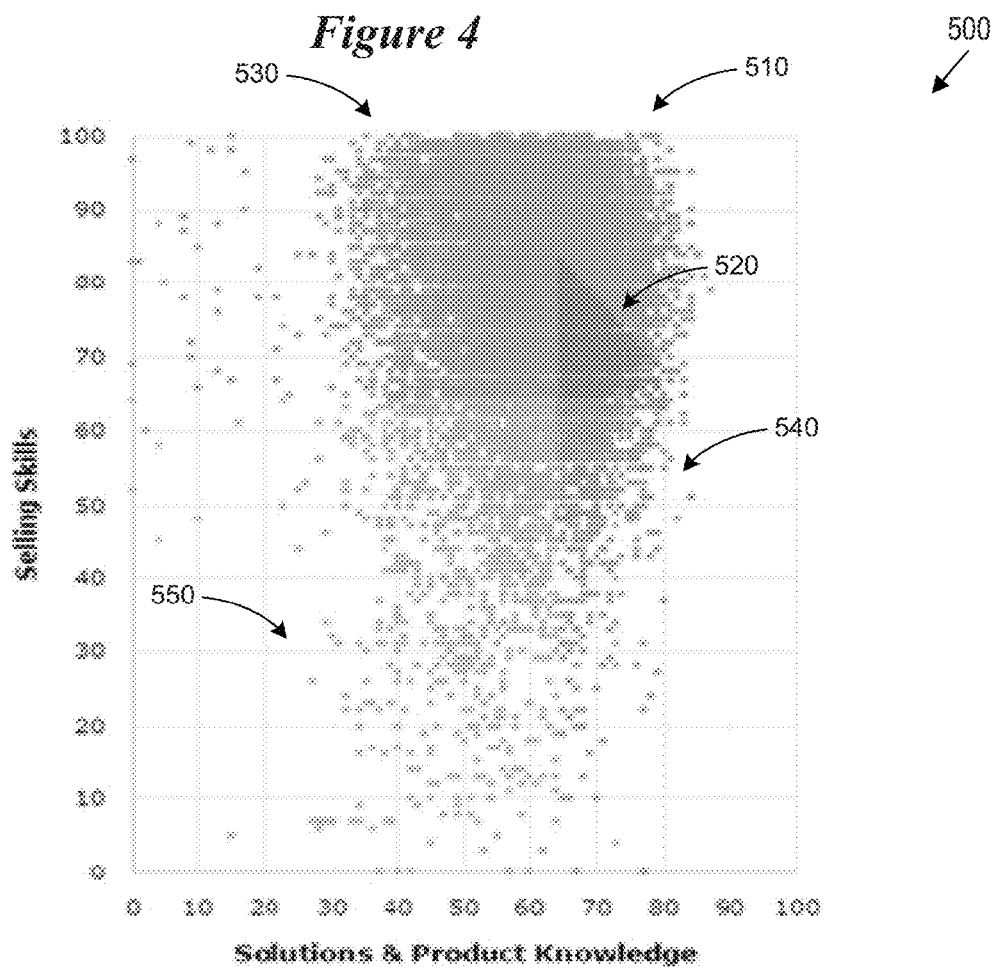
FIG. 5 shows an example correlation presentation which is presented within a sales training activity user interface.

Referring to FIG. 5, an example correlation presentation 500 which is presented within a sales training activity user interface is shown. In certain embodiments, the correlation presentation 500 includes one or more a LTS certified region 510, a selling professionals region 520, a relationship region 530, a solutions and product experts region 540 and a transactional sellers region 550.

The LTS certified region 510 represents sellers who have the best average scores across both solutions and product and selling skills. The selling professionals region 520 represents selling professionals who have good solutions and product knowledge and their selling approaches are typically relationship based. In certain embodiments sellers represented in the selling professionals region have achieved ≥65% on each assessment and <75% average across both assessments. The relationship region represents sellers who have potential development opportunities in solutions and product knowledge. These types of sellers have basic solutions and product knowledge and their selling approaches are typically relationship based. In certain embodiments sellers represented in the relationship region have achieved ≥65% on selling skills and <65% on solutions and product. The solutions and product experts regions 540 represents sellers who have potential development opportunities in selling skills. These types of sellers have good solutions and product knowledge and their selling approaches are typically transactional based. In certain embodiments sellers represented in the solutions and products experts region have achieved <65% on selling skills and ≥65% on solutions and product. The transactional sellers region represents sellers who have potential development opportunities in both selling skills and solutions and product knowledge. These type of sellers have basic solutions and product knowledge and their selling approaches are typically transactional based. In certain embodiments sellers represented in the transactional sellers region have Achieved <65% on selling skills and <65% on solutions and product.

Figure 6:
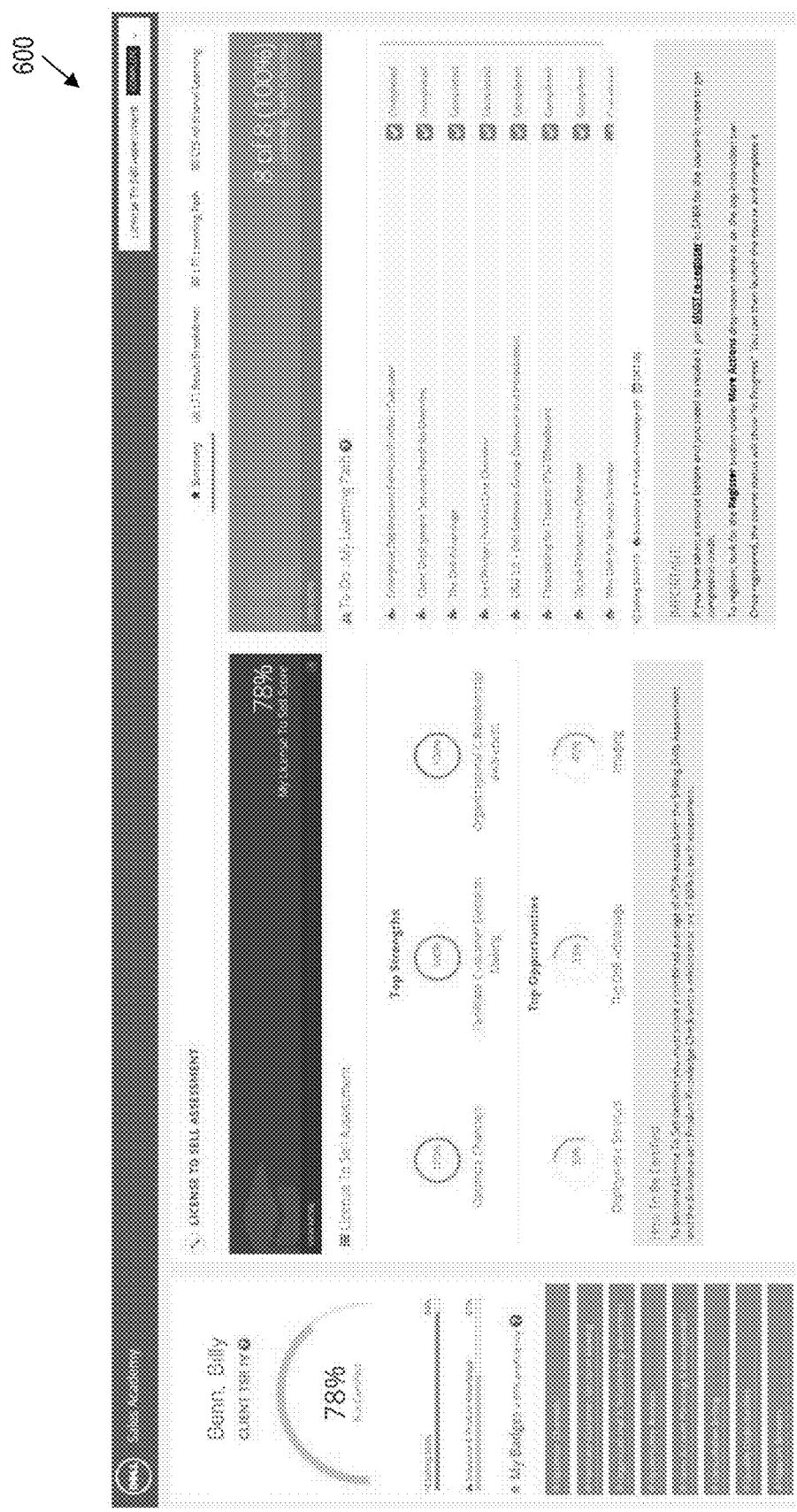
FIG. 6 shows an example screen presentation of an individual's portal landing user interface.

Referring to FIG. 6, an example screen presentation of an individual's portal landing user interface 600 is shown. The individual's portal landing user interface 600 is an example of a sales activity training user interface. With the individual's portal landing user interface 600, each manager with access to the sales training activity automation system 205 has access to their individual results, their individual learning path, strengths and opportunities and progress against learning paths. In certain embodiments, their individual learning path includes embedded links to a learning management system to enroll and participate in training tailored to the specific individual based upon their individual learning path.

Figure 7:
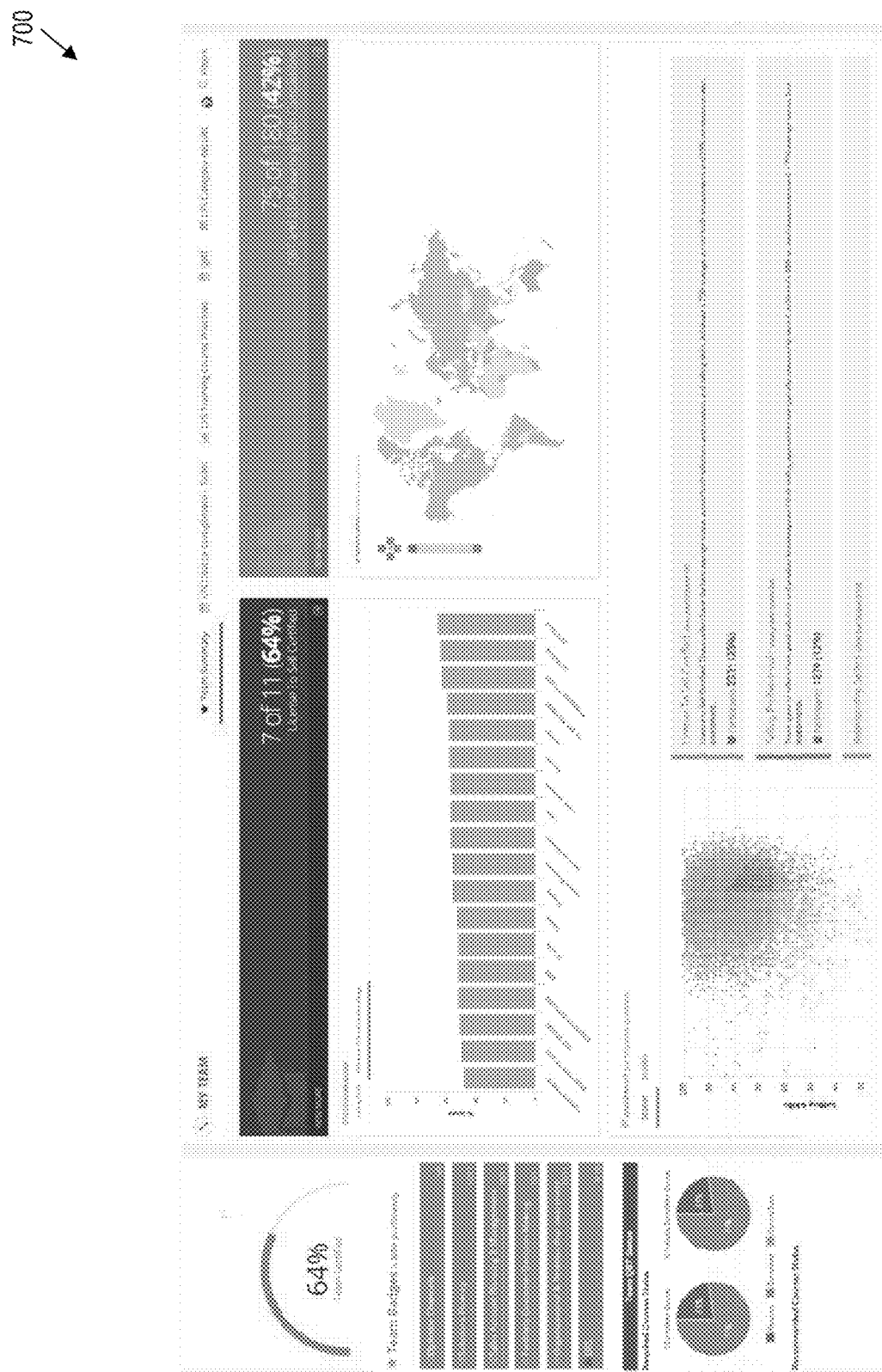
FIG. 7 shows an example screen presentation of a manager's portal landing user interface.

Referring to FIG. 7, an example screen presentation of a manager's portal landing user interface 700 is shown. The manager's portal landing user interface 600 is an example of a sales activity training user interface. With the manager's portal landing user interface 700, each manager with access to the has access to individual and team results, individual and team learning paths, team strengths and opportunities and progress against learning paths.

Figure 8:
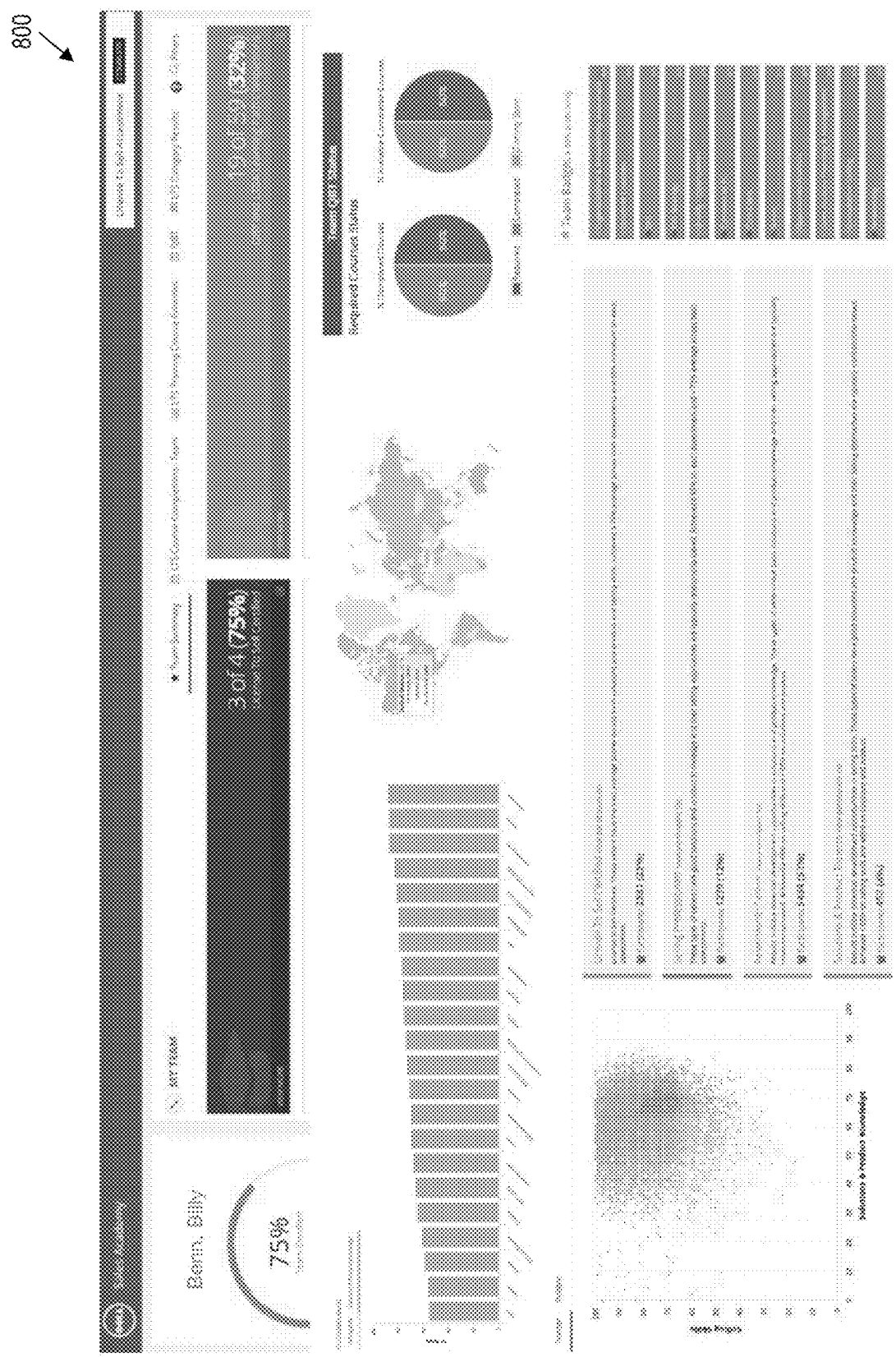
FIG. 8 shows an example screen presentation of an executive's portal landing user interface.

Referring to FIG. 8, an example screen presentation of an executive's portal landing user interface 800 is shown. The executive's portal landing user interface 800 is an example of a sales activity training user interface. With the executive's portal landing user interface 800, each executive with access to the sales training activity automation system 205 has access to one or more of results by total organization, by manager, by team, by individual and/or by role, learning paths for each, strengths and opportunities for each and progress against learning paths for each. In certain embodiments, the screen presentation for the executive's portal landing user interface 800 is similar to that of the manager's portal landing user interface 700. However, while managers have access to information for just their team, executives have access to a consolidated view for all of their teams. Additionally, in certain embodiments, executives can access data by manager, team, individual via the executive's portal landing user interface 800.

Figure 9:
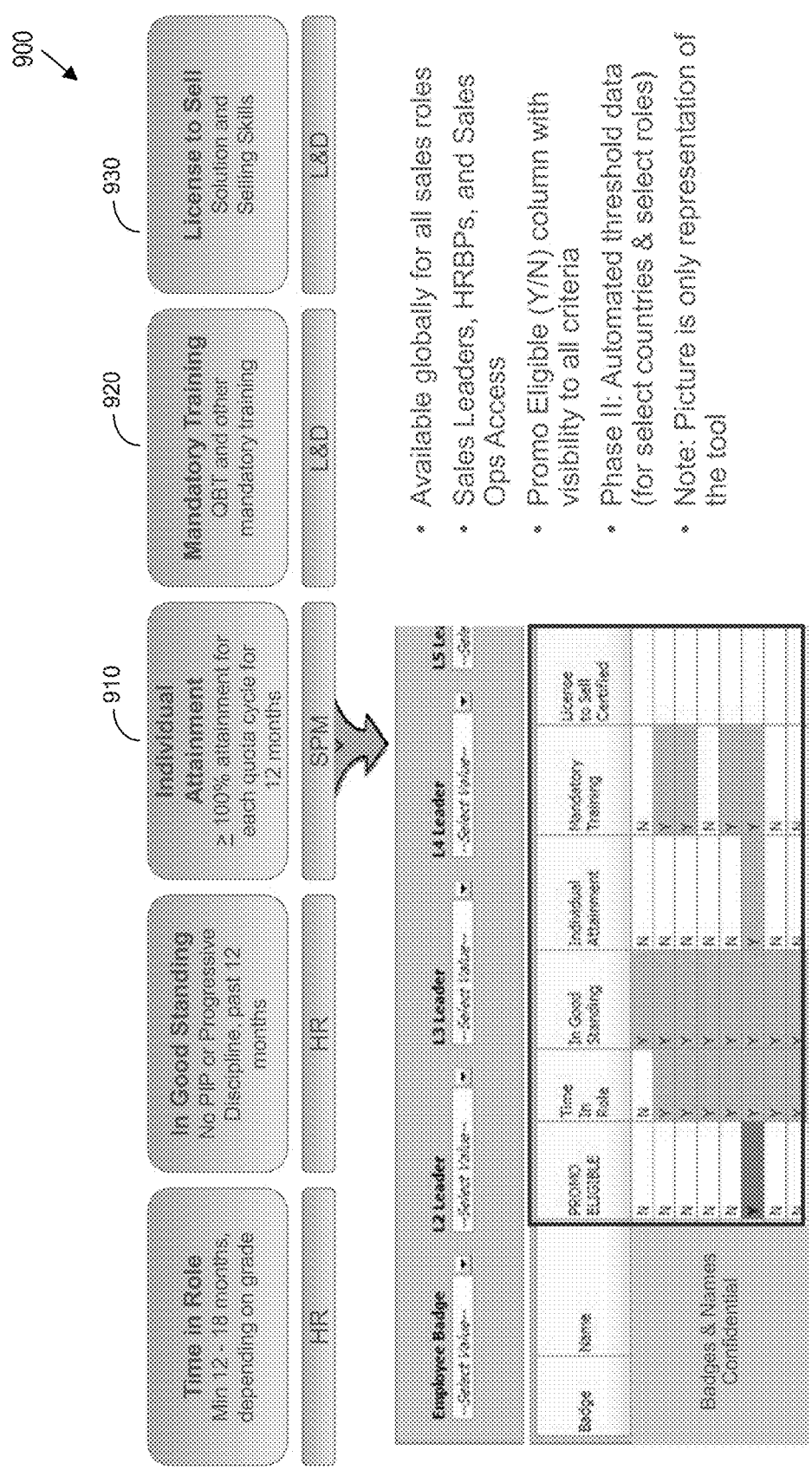
FIG. 9 shows a block diagram showing how license to sell information is integrated into human resource career progression activities.

Referring to FIG. 9, a block diagram showing how license to sell information is integrated into human resource career progression activities 900. More specifically, criteria regarding a sales maker readiness can include information regarding individual attainment 910, mandatory training 920 and license to sell certification 930.

Figure 10:
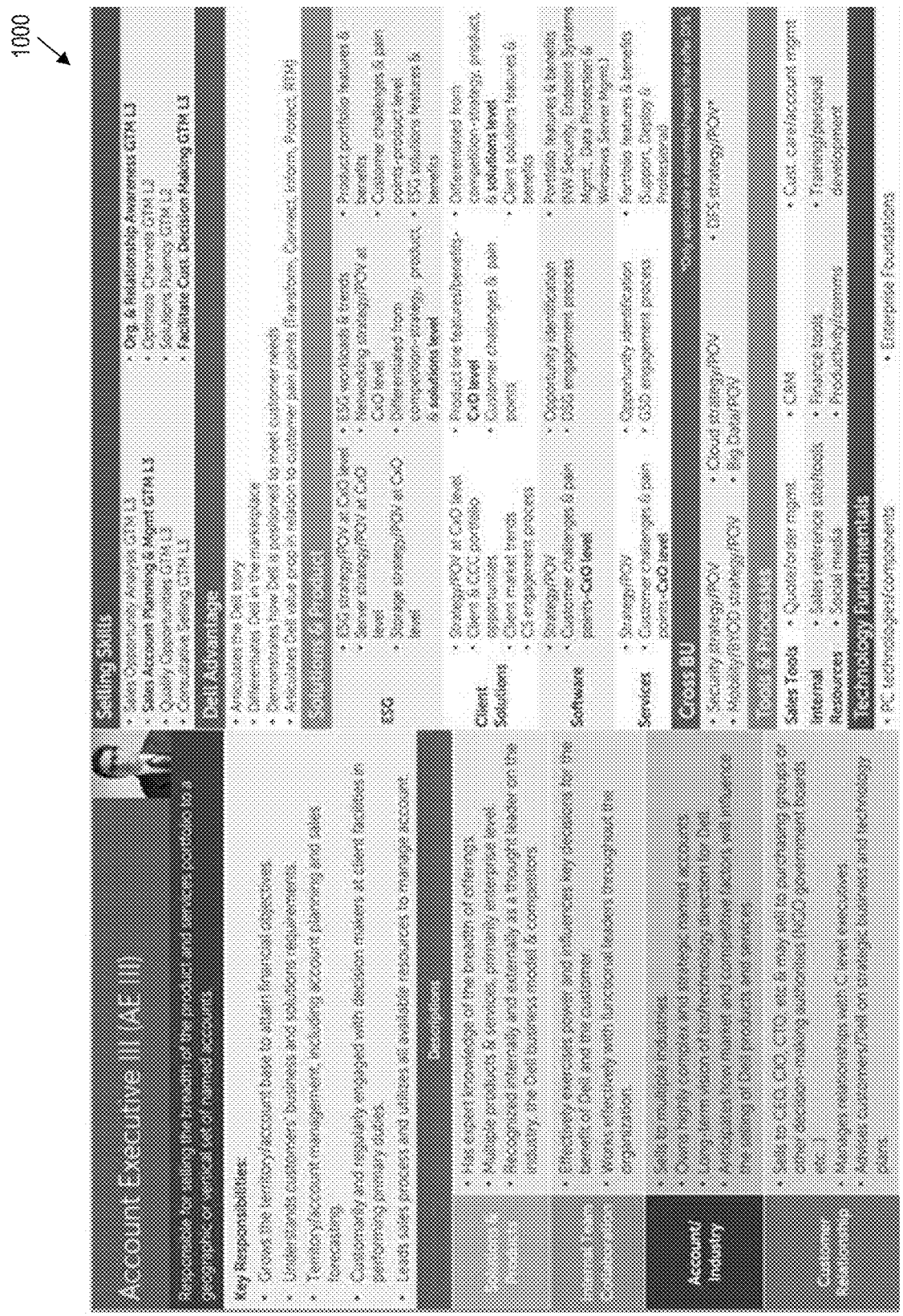
FIG. 10 shows an example role packet user interface.

Referring to FIG. 10, an example role packet user interface 1000 is shown. The role packet user interface 1000 is an example of a sales activity training user interface. The example role packet user interface 1000 corresponds to the role of a level 3 account executive. The role packet user interface provides information contained within a particular role packet to a user via the role packet user interface.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an automated sales training activity operation, comprising:
   performing an assessment operation on an individual sales maker via an automated sales training activity system, the automated sales training system executing on a hardware processor of an information handling system, the individual sales maker having a sales role, the assessment operation ensuring the individual sales maker takes only the training needed by the individual sales maker;
   generating a unique personalized training plan for the individual sales maker via the automated sales training system, the unique personalized training plan being generated automatically by an automated sales training activity module, the unique personalized training plan being aligned with a role packet, the role packet defining expectations for a sales role, the role packet including information regarding role definition, role responsibilities, competencies required for the sales role and performance indicators for the sales role;
   delivering training to the individual sales maker based upon the unique personalized training plan via an individual user portal landing user interface presented via the automated sales training system, the individual user portal landing user interface comprising an embedded link to the automated sales training system to allow the individual sales maker to enroll and participate in training tailored to the individual sales maker based upon the unique personalized training plan of the individual sales maker;
   certifying the individual sales maker based upon completion of the training via the automated sales training system, the certifying indicating a knowledge and proficiency level of the individual sales maker, the certifying also indicating progress of the individual sales maker towards completion of the unique personalized training plan; and,
   presenting information regarding the certifying via a sales training activity user interface generated by the automated sales training system.

2. The method of claim 1, further comprising:
accessing one of a plurality of role packets when performing the individual sales maker assessment.

3. The method of claim 2, wherein:
each of the plurality of role packets corresponds to a particular sales role.

4. The method of claim 2, wherein:
each of the plurality of role packets including information regarding job description, job competency requirements and Key Performance Indicators (KPIs).

5. The method of claim 2, wherein:
the plurality of role packets comprise at least one of Key Performance Indicator (KPI) role packets, rules of engagement type role packets and global competencies type role packets.

6. The method of claim 1, wherein:
the sales training activity operation is integrated with human resource (HR) performance management resulting in an opportunity for career progression for the individual sales maker based upon certification by the sales training activity operation.

7. A system comprising:
a hardware processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

performing an assessment operation on an individual sales maker via an automated sales training activity system, the automated sales training system executing on the hardware processor, the individual sales maker having a sales role, the assessment operation ensuring the individual sales maker takes only the training needed by the individual sales maker;

generating a unique personalized training plan for the individual sales maker, the unique personalized training plan being generated automatically by an automated sales training activity module, the unique personalized training plan being aligned with a role packet, the role packet defining expectations for a sales role, the role packet including information regarding role definition, role responsibilities, competencies required for the sales role and performance indicators for the sales role;

delivering training to the individual sales maker based upon the unique personalized training plan via an individual user portal landing user interface presented via the automated sales training system, the individual user portal landing user interface comprising an embedded link to the automated sales training system to allow the individual sales maker to enroll and participate in training tailored to the individual sales maker based upon the unique personalized training plan of the individual sales maker;

certifying the individual sales maker based upon completion of the training, the certifying indicating a knowledge and proficiency level of the individual sales maker, the certifying also indicating progress of the individual sales maker towards completion of the unique personalized training plan; and, presenting information regarding the certifying via a sales training activity user interface.

8. The system of claim 7, wherein:
accessing one of a plurality of role packets when performing the individual sales maker assessment.

9. The system of claim 8, wherein:
each of the plurality of role packets corresponds to a particular sales role.

10. The system of claim 8, wherein:
each of the plurality of role packets including information regarding job description, job competency requirements and Key Performance Indicators (KPIs).

11. The system of claim 7, wherein:
the plurality of role packets comprise at least one of Key Performance Indicator (KPI) role packets, rules of engagement type role packets and global competencies type role packets.

12. The system of claim 7, wherein:
the sales training activity operation is integrated with human resource (HR) performance management resulting in an opportunity for career progression for the individual sales maker based upon certification by the sales training activity operation.

13. A non-transitory, computer-readable storage medium embodying computer program code, the computer program code comprising computer executable instructions configured for:

performing an assessment operation on an individual sales maker via an automated sales training activity system, the automated sales training system executing on a hardware processor of an information handling system, the individual sales maker having a sales role, the assessment operation ensuring the individual sales maker takes only the training needed by the individual sales maker;

generating a unique personalized training plan for the individual sales maker, the unique personalized training plan being generated automatically by an automated sales training activity module, the unique personalized training plan being aligned with a role packet, the role packet defining expectations for a sales role, the role packet including information regarding role definition, role responsibilities, competencies required for the sales role and performance indicators for the sales role;

delivering training to the individual sales maker based upon the unique personalized training plan via an individual user portal landing user interface presented via the automated sales training system, the individual user portal landing user interface comprising an embedded link to the automated sales training system to allow the individual sales maker to enroll and participate in training tailored to the individual sales maker based upon the unique personalized training plan of the individual sales maker;

certifying the individual sales maker based upon completion of the training, the certifying indicating a knowledge and proficiency level of the individual sales maker, the certifying also indicating progress of the individual sales maker towards completion of the unique personalized training plan; and, presenting information regarding the certifying via a sales training activity user interface.

14. The non-transitory, computer-readable storage medium of claim 13, wherein:
accessing one of a plurality of role packets when performing the individual sales maker assessment.

15. The non-transitory, computer-readable storage medium of claim 14, wherein:
each of the plurality of role packets corresponds to a particular sales role.

16. The non-transitory, computer-readable storage medium of claim 14, wherein:
each of the plurality of role packets including information regarding job description, job competency requirements and Key Performance Indicators (KPIs).

17. The non-transitory, computer-readable storage medium of claim 14, wherein:
the plurality of role packets comprise at least one of Key Performance Indicator (KPI) role packets, rules of engagement type role packets and global competencies type role packets.

18. The non-transitory, computer-readable storage medium of claim 13, wherein:
the sales training activity operation is integrated with human resource (HR) performance management resulting in an opportunity for career progression for the individual sales maker based upon certification by the sales training activity operation.

* * * * *